No. 805,106. PATENTED NOV. 21, 1905.
J. TREADWELL.
PLANT FOR MAKING BRIQUETS.
APPLICATION FILED JAN. 24, 1905.
5 SHEETS—SHEET 5.
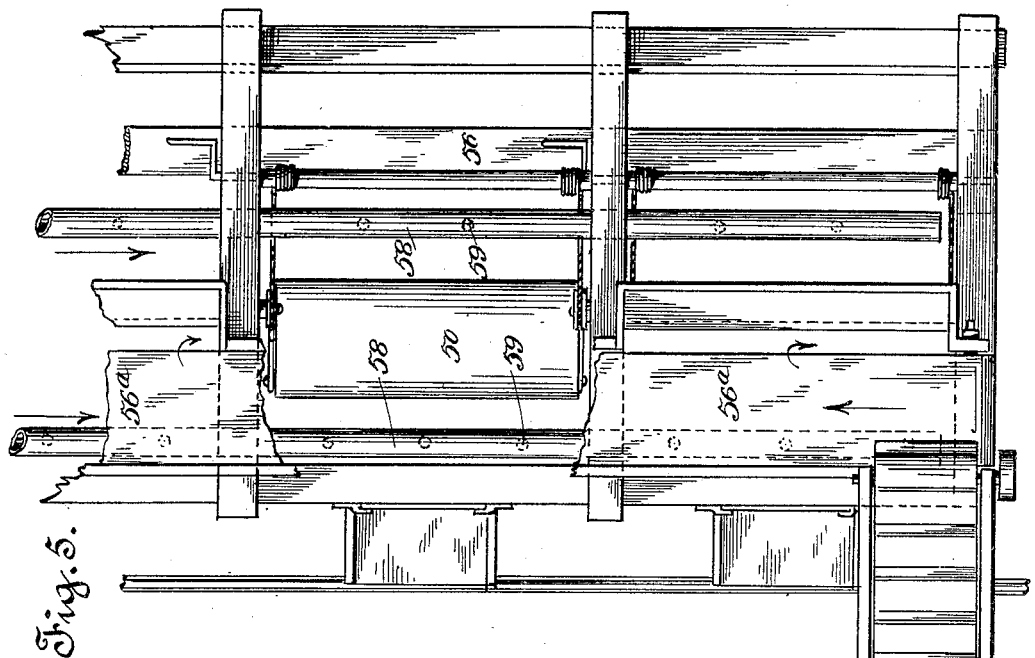
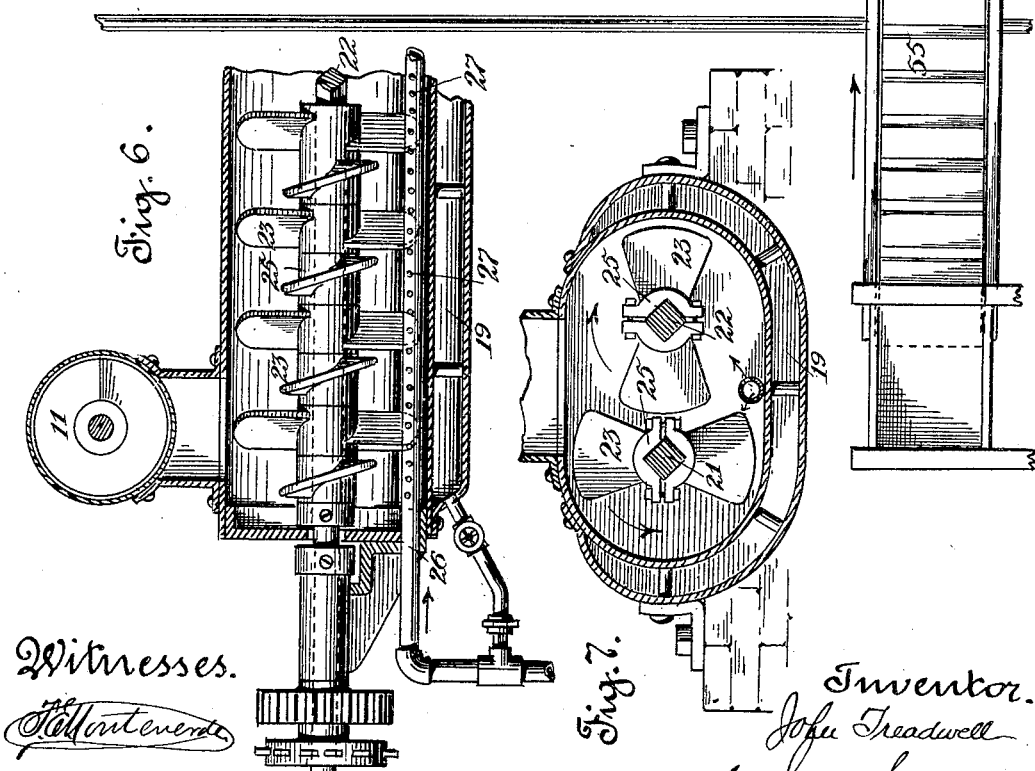

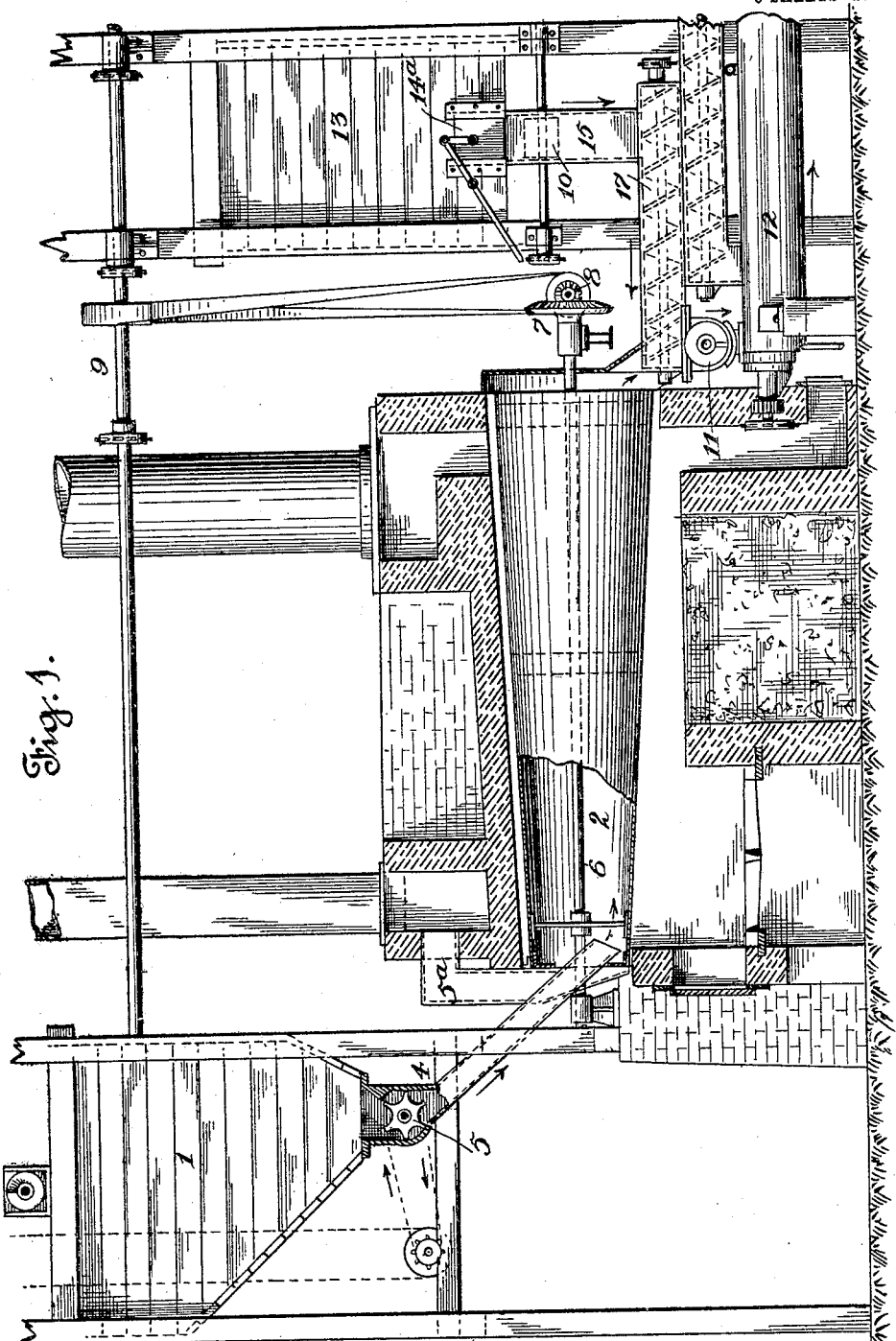

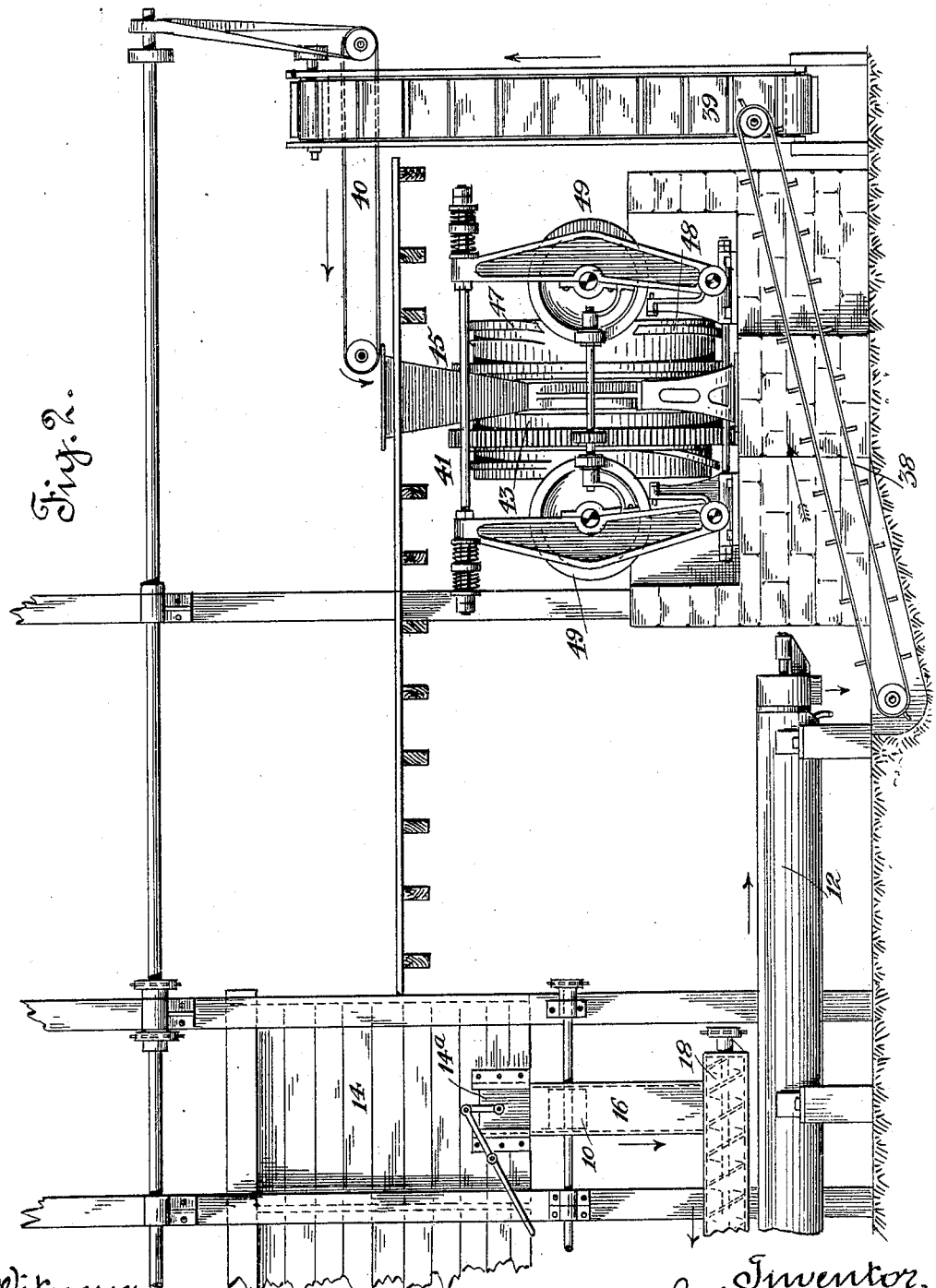

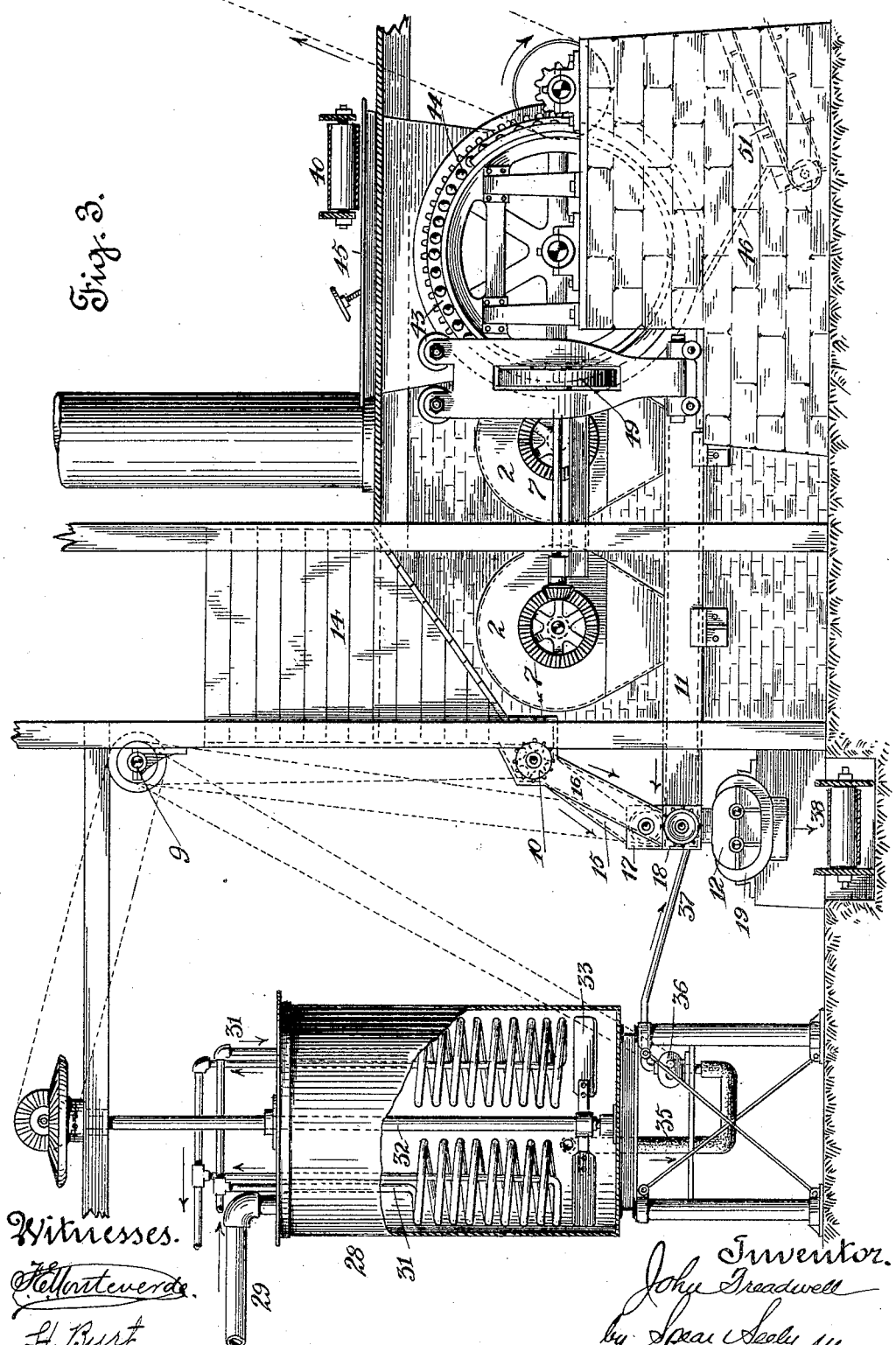

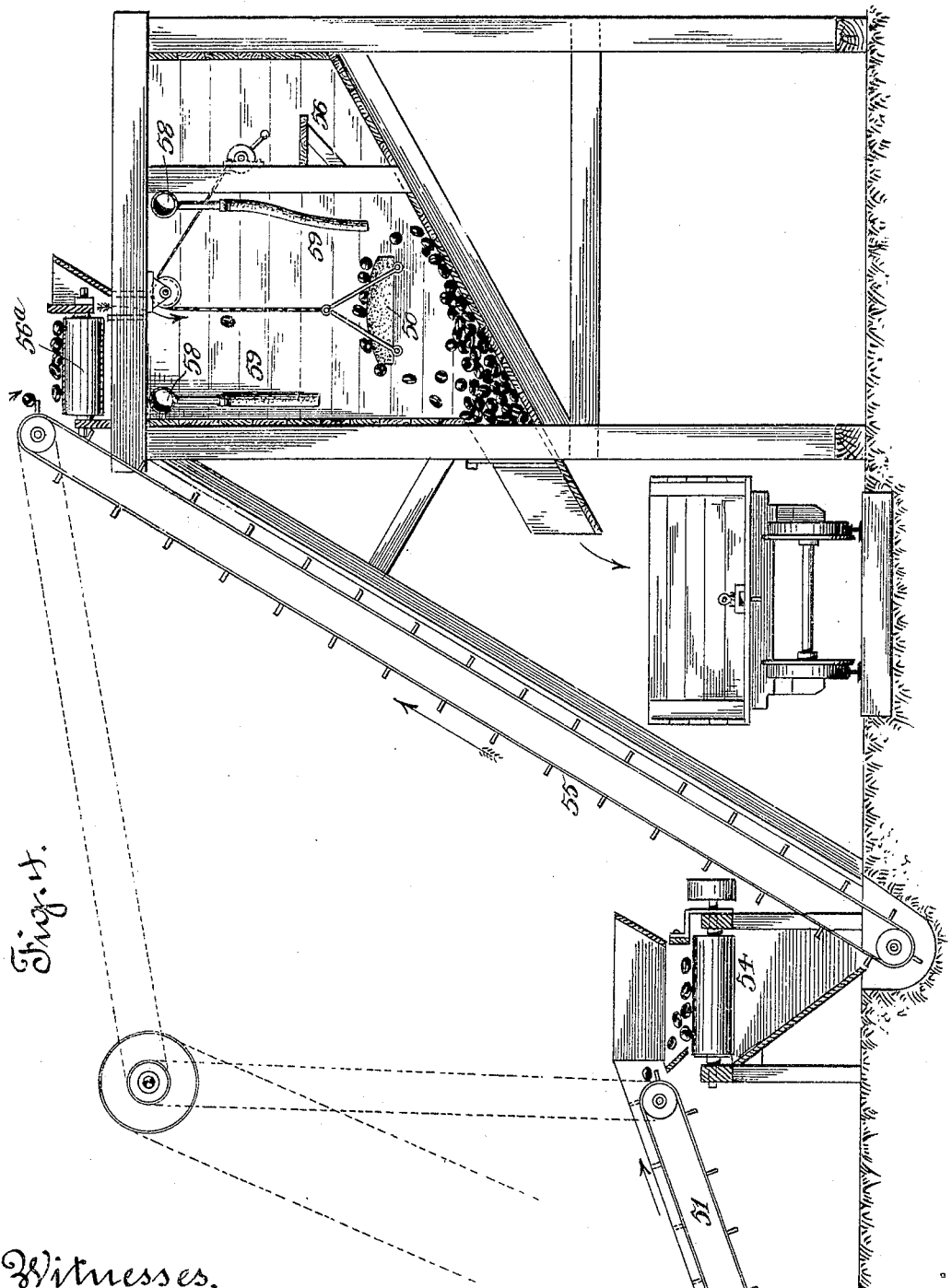

UNITED STATES PATENT OFFICE.

JOHN TREADWELL, OF SAN FRANCISCO, CALIFORNIA.

PLANT FOR MAKING BRIQUETS.

No. 805,106.      Specification of Letters Patent.      Patented Nov. 21, 1905.

Application filed January 24, 1905. Serial No. 242,556.

*To all whom it may concern:*

Be it known that I, JOHN TREADWELL, a citizen of the United States, residing at San Francisco, in the county of San Francisco and State of California, have invented certain new and useful Improvements in Plants for Making Briquets, of which the following is a specification.

My invention relates to the production of artificial fuel in the shape of briquets; and it consists in a plant for their manufacture comprising an assemblage of coöperating devices by means of which I am enabled to produce briquets with great rapidity, with a high degree of commercial economy, and of a quality which enables them to stand a practically-unlimited amount of transportation and exposure.

There are many factors and conditions entering into the manufacture of briquets on a large scale which have required long and expensive experiment before arriving at the successful result by the combined apparatus herein described.

It has been one of my objects to produce briquets far more rapidly than has heretofore been attempted or considered possible, and this object has been accomplished by making the supplies of material and their transit through the apparatus continuous as distinguished from intermittent or successive charges of materials, and this without interfering with either the accurate measurements of proportions or with the treatment of separate and combined ingredients. The plant is practically automatic in operation throughout, such automatic operation commencing with the supply of pulverized coal or other suitable fine material, including the treatment of such coal, the measured supply and treatment of ingredients to be mixed with it, the mixing and treatment of the combined substances in proper proportions, the formation of the briquets and their discharge into storage-bunkers, all forming a compact plant economical in operation and whose remarkable capacity has been referred to. The continuity of operation prevails throughout the plant and is rendered possible by combining the different apparatus in the manner hereinafter explained.

The invention is illustrated in the accompanying drawings, in connection with which this description should be read, and wherein—

Figures 1 and 2 taken together constitute an elevation of the entire briquet-making apparatus, the pitch-heating apparatus being omitted to avoid obscuring other parts. Fig. 3 is an end elevation, including the heater for pitch. Fig. 4 is an elevation of the means for discharging, storing, and cooling finished briquets. Fig. 5 is a plan view of Fig. 4. Fig. 6 is a longitudinal section of the mixer. Fig. 7 is a cross-section of the same.

The operation of the plant begins with the delivery of fine coal, crushed or pulverized lignite, or whatever material forms the basis of the ultimate fuel from the bunker 1 containing it into the rotary drier or driers 2, Fig. 1. The discharge is through chutes 4, having rotary pocket-wheels 5, driven by suitable connections, which regulate the amount delivered according to their speed in rotation. The driers 2 are tapering shells incased in brickwork provided with a grate and forming a surrounding hot-air chamber. Flues 5$^a$, communicating with the shells, allow steam, gases, &c., to escape into the stack. The shells are fixed on shafts 6, journaled in bearings and driven by bevel-gears 7 8, having belt connections to the overhead shaft 9. The material, which I shall hereinafter refer to as the "coal," is thoroughly turned over and dried in these shells and owing to the incline of their bottoms discharges itself through the rear ends and into the screw conveyer 11, Figs. 1 and 6, which communicates with the mixing-chamber 12, Figs. 1, 2, 6, and 7.

The purpose of the mixer is to incorporate with the coal the binding material, which renders it cohesive and compressible, and such material is usually a pitch of asphaltic or coal-tar nature. As, however, some kinds of carboniferous material may require enriching with like material of a more combustible nature or as the composition may need the addition of a proportion of some hard material, such as lime carbonate, in order to toughen it, I provide one or more bins, two being shown in the drawings at 13 and 14. These bins are suitably supported in a vertical structure, which may also be provided with bearings for the overhead shaft 9, and it will be understood that the bin at the right of Fig. 1 is part of the same structure shown at the left of Fig. 2. Each bin is provided with an outlet having a regulating-gate 14$^a$, leading to discharge-chutes 15 16, and each chute is provided with a measuring device consisting of a rotary wheel 10, provided with pockets and mounted on a shaft driven by suitable connections from the overhead shaft 9. The bin 13 discharges into a rotary conveyer 17, which connects with the transverse conveyer 11. The bin 14 connects with a separate and similar conveyer 18, which discharges directly into the mixing-chamber near the inlet end of the latter. The binding material enters the mixer at a point considerably in advance of that at which material is received from the bin or bins, so that there will be a complete agitation, mixing, and incorporating of all the dry ingredients before they come in contact with such binding material. The mixing-chamber is a long shell having an external steam-jacket 19 and provided with the novel mixing apparatus shown in Figs. 6 and 7. Two square shafts 21 22 extend longitudinally through the mixer, upon which are mounted the mixing-blades 23. The arrangement of these blades will be fully understood from Figs. 6 and 7. Each blade forms part of a half-sleeve 25, bolted to a similar half and having a square bearing to fit the shaft. The blades are set at such a pitch as to act as positive feeding devices and to carry the material through the mixer, as well as to stir and incorporate it, and the pitch and speed at which the blades run are proportioned to the rate of supply of material, so that the mixer will deliver an exact supply of such material when mingled with the binding substance. On each shaft the blades are disposed at right angles, and this right-angular arrangement is in alternation with a similar arrangement of blades on the adjoining shaft. As the shafts are rotated in opposite directions (arrows in Fig. 7) the blades run in very close proximity both longitudinally and transversely, but without interference, the result being that every part of the ingredients applied to the mixer is subjected to the action of said blades. A steam-pipe 26, having a large number of perforations or jets 27, extends through the interior of the mixing-chamber, while a branch from said pipe enters the surrounding jacket and keeps the chamber hot.

The binding material, which may be of any suitable nature and which I shall hereinafter refer to as "pitch," is supplied from any suitable place of storage to the heater 28, Fig. 3. This heater is a shell into which enters the pitch-supplying pipe 29 and steam-inlet pipes 31, which within the shell are formed into coils. Within the shells is a vertical shaft 32, driven from above by bevel-gears having connections to the shaft 9. Mounted upon the shaft 32 is a stirring device consisting of the rotary blades 33, which turn in the hot melted pitch and by keeping it in movement prevent its adhesion to the bottom of the heater and facilitate its discharge therefrom. A suitable protected discharge-pipe 35 leads from the pitch-heater and forms the inlet to a pump 36, whose outlet is a pipe 37, which connects with the mixing-chamber, as shown in Fig. 3. I prefer to jacket the pump and also form a bore and outlet in its shaft, so that steam can be admitted to its interior as well as to said jacket. Thus before starting or after shutting down the pump can be heated and material be prevented from stopping or hardening there and interfering with its operation. As above stated, the hot pitch is admitted to the mixer after all the dry ingredients have been thoroughly incorporated together. As the pitch enters the mixer it is subjected to the action of the mixing-blades throughout the whole remaining extent of the mixing-chamber and before reaching the outlet from the rear end of said chamber has been completely mixed and incorporated with the dry ingredients, so as to form a cohesive and compressible mass. This mixture is discharged from the end of the mixing-chamber upon an endless carrier 38, which is one of the series of carriers, such as 39 and 40, which convey it to the briquet press or presses 41. This is in practice a long series of carriers several hundred feet in length, which are disposed in the manner most convenient and which are intended to give the material a long exposure to the air, so as to cool it before pressing. Auxiliary cooling-air can be supplied by blowers at points along the route covered by the carriers; but I have not considered it necessary to illustrate such blowers, as their construction and the manner of using them are well understood.

I do not in this application limit myself to any particular construction of briquet-press; but I prefer to use and have used in practice the type of presses shown in Letters Patent of the United States No. 640,109, granted December 26, 1899, to myself as assignee of John T. Davis and further improved by myself, as described in Letters Patent No. 784,083, granted March 7, 1905. This press is of continuous rotary character, of extraordinary capacity, and is, so far as I am aware, the only press which can handle material delivered continuously, and so make perfect briquets upon a large scale. The construction of said press is fully described in the patent and application referred to, and I therefore make only a general reference to it in this description. It comprises a rotary wheel 43, having a grooved periphery, transverse molds formed in a wall of the rim, and transverse plungers 44, which are guided across the rim and compress material supplied to said groove from the hopper 45 into said molds. The movements of these plungers are controlled by a system of cams, (illustrated at 47 and 48;) but the pressure is applied by the pivoted and journaled rollers 49, set opposite each other and with which the heads of the plungers contact as said heads are compelled to pass under said rollers. There being a large number of plungers arranged in a circular series around the wheel, as many briquets are formed at each revolution of the latter as there are plungers in the series, the result being that a rapid succession of compressed briquets is discharged from the press upon the incline 46 and from this upon the carrier 51, Fig. 3, dotted lines.

The briquets when discharged from the press are carried by the carrier 51, just referred to, and delivered upon the carrier 54, Fig. 4. From the latter the briquets are carried to the endless elevator 55, by which they are raised to the top of the structure, which contains all the bunkers for the ordinary fine coal and for the finished product. The bunkers for the latter are of considerable extent, as indicated in Fig. 5, and along their top runs the horizontal belt or carrier 56$^a$, which receives the briquets from the elevator, as illustrated in the figure last referred to. As the briquets, even though cooled to some extent by exposure to air while carried on the carriers and elevator, are still hot enough to render them liable to become mashed together in the bottom of the bunker by their weight, I provide devices within the bunker both for breaking their fall and also for cooling them as they are discharged.

In Fig. 4, 50 represents one of a series of mattresses or cushions within the bunker, suspended by ropes passing over pulleys therein, which ropes are provided with winding means. These mattresses have curved tops and are located immediately below the discharge from the horizontal belt. An attendant standing on the footboard 56 adjusts these mattresses, independently raising them as that part of the bunker fills. The curved mattresses prevent the briquets from lodging upon them, and they are simply interrupted in their fall; but as the mattresses are kept in proximity to the stored briquets the latter are discharged over their edges without injury. The briquets can be deflected off the horizontal carrier at any desired place, the mattresses being adjusted independently at any point in the bunker which is being filled. The idea in this discharge from a long longitudinal carrier into the bunker is that the bunker shall be filled in layers, so to speak—that is, that the filling should go on from end to end in comparatively small quantities at any one point, giving those delivered at such point time to be well cooled before others are discharged on top of them. Within the bunkers are longitudinal pipes 58, from which adjustable lengths of hose 59 are suspended and through which air is forced in jets or currents, the air being directed downwardly against the mass of briquets. The flexible hose is self-adjusting as the bunker fills, so that the admission of air requires no special attention. I have found in practice that the stored products are in this way perfectly cooled and that even though piled to the top of the bunkers they will not adhere to one another during any period of storage. They are now ready for discharge into any means of transportation, such as the car shown in Fig. 4.

Having thus fully described my invention, what I claim as new, and desire to secure by Letters Patent, is—

1. In a briqueting plant, the combination of the following elements forming a continuously-operative apparatus: a bunker for fine coal, a drier, a communication between the bunker and drier having a measuring device for measuring the coal as it is supplied continuously, a mixer, a communication for supplying coal to and at one end of the mixer, a heater for binding material, a communication, from the heater to the mixer which enters the mixer at a point intermediate of its length, briquet-pressing mechanism, and a series of endless carriers between the mixer and the pressing mechanism.

2. In a briqueting plant the combination of the following elements forming a continuously-operative apparatus; a bunker for fine coal, a drier, a communication between the bunker and drier having a device for measuring the coal as it is supplied continuously, a mixer-cylinder, a heater for binding material, a communication from said heater to the mixer which includes a pump and which enters the mixer at a point intermediate of its length, briquet-pressing mechanism and a series of endless carriers between the mixer and the pressing mechanism.

3. In a briqueting plant the combination of the following elements forming a continuously-operative apparatus; a bunker for fine coal, a drier, a communication between the bunker and drier having a measuring device for measuring the coal as it is supplied continuously, a mixing-cylinder, one or more receptacles provided with measuring devices for supplying additional dry ingredients, conveyers for delivering said dry materials to the mixer near its inlet end, a heater for binding material, a communication from said heater to the mixer which enters the mixer at a point intermediate of its length, briquet-pressing mechanism and a series of carriers between the mixer and the pressing mechanism.

4. In a briquet-pressing plant the combination of the following elements forming a continuously-operative apparatus; a bunker for fine coal, a drier, a communication between the bunker and drier having a measuring device for measuring the coal as it is supplied continuously, a mixing-cylinder for binding material, a communication from said heater to the mixer which enters the mixer at a point intermediate of its length, briquet-pressing mechanism, a series of endless carriers between the mixer and the pressing mechanism, a briquet-bunker, means for cooling the briquets in transit from the pressing mechanism to the bunker, and means for cooling them after delivery to the said bunker.

5. In a briqueting plant, a bunker provided with means for measuring a continuous flow of coal, a rotary drier, a rotary mixer, a pitch-heater connected to the mixer, a pump included in the connection, a system of drapers for conveying the mixed material, and gearing, by which said measuring devices, said drier, said mixer, said pump, and said drapers are continuously driven.

6. In a briquet plant, the coal-bunker having a measuring device for a continuous flow of coal, the rotary drier for said coal, one or more bins having devices for measuring a continuous flow of additional dry material, conveyers from the drier and from said bin or bins, a mixing-cylinder into the front of which the material from said drier and said bin or bins is admitted, a pitch-heater, a connection from said heater entering the mixer in advance of the inlet for said dry materials, a system of endless carriers leading from the discharge end of the mixer; and gearing for driving continuously said measuring devices, said drier, said conveyers, said mixer and said endless carriers.

7. In a briquet plant, the combination with the continuously-operating mechanism for supplying, measuring, and drying the coal and with continuously-operating mechanism for supplying and measuring additional dry material, and with continuously-operating mechanism for supplying and measuring a binding material, and with a continuously-operating mechanism for mixing and conveying all of said ingredients of a rotary briquet-press continuously operated in an unchanging direction of motion.

8. In a briquet plant, the combination with continuously-operated mechanism for preparing and mixing ingredients for compression, and with a pressing mechanism, of a receiving-bunker for hot finished briquets, and cooling means within said bunkers for cooling said briquets as received and after reception.

9. In a briquet plant, the combination with continuously-operated and connected mechanisms for preparing and mixing ingredients for compression, and with a pressing mechanism, of carriers leading from said pressing mechanism, a briquet-bunker, and one of said carriers extending along the top of said bunker, whereby briquets can be deflected into said bunker at any desired point in its extent.

10. In a briquet plant, the combination with continuously-operated mechanisms for preparing and mixing ingredients for compression, and with pressing mechanism, of carriers for delivering hot briquets from the pressing mechanism, a receiving-bunker, and adjustable mattresses within said bunker for breaking the fall of the briquets delivered and for distributing them, practically in layers, within the bunkers.

In testimony whereof I have affixed my signature, in presence of two witnesses, this 18th day of January, 1905.

JOHN TREADWELL.

Witnesses:
M. R. SEELY,
HENRIETTE BURT.